United States Patent [19]

Kanai et al.

[11] 3,935,166

[45] Jan. 27, 1976

[54] AROMATIC POLYESTER OF 2,6 AND/OR 2,7 NAPHTHALENE DICARBOXYLIC ACID

[75] Inventors: Tamaki Kanai, Machida; Takashi Yamagishi; Tetsuya Ohta, both of Sagamihara; Hiroatsu Moriyama, Hachioji, all of Japan

[73] Assignee: Teijin Limited, Osaka, Japan

[22] Filed: Aug. 22, 1974

[21] Appl. No.: 499,607

Related U.S. Application Data

[63] Continuation of Ser. No. 368,288, June 8, 1973, abandoned.

[52] U.S. Cl. ...... 260/47 C; 260/32.8 R; 260/33.4 P; 260/33.6 R; 260/33.8 R; 260/40 R; 260/45.9 R; 260/45.95; 260/47 CZ; 260/47 CP; 260/49; 260/75 NK; 260/835; 260/860

[51] Int. Cl.² .................................. C08G 63/66

[58] Field of Search ............... 260/47 C, 49, 50

[56] References Cited
UNITED STATES PATENTS

| | | | |
|---|---|---|---|
| 2,626,939 | 1/1953 | Hoogsteen et al. | 260/22 |
| 2,762,789 | 9/1956 | Fisher et al. | 260/75 |
| 2,902,518 | 9/1959 | Hurdis et al. | 260/613 |
| 3,162,615 | 12/1964 | Bremmer | 260/47 |
| 3,525,715 | 8/1970 | Hrach et al. | 260/47 |

*Primary Examiner*—Lester L. Lee
*Attorney, Agent, or Firm*—Sherman & Shalloway

[57] ABSTRACT

A linear aromatic polyester comprising, in the polymer molecule, at least 50 mole % of a repeating unit being represented by the formula

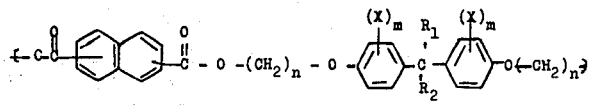

in which
R₁ and R₂ are the same or different and represent an alkyl group of 1-3 carbons, $n$ is an integer of 1-6, X is a halogen atom and $m$ is 0, 1 or 2,
with an intrinsic viscosity of 0.3 or more when measured at 35°C. by use of orthochlorophenol as a solvent.

6 Claims, No Drawings

AROMATIC POLYESTER OF 2,6 AND/OR 2,7 NAPHTHALENE DICARBOXYLIC ACID

This is a continuation of application Ser. No. 368,288, filed June 8, 1973, now abandoned.

The instant invention is concerned with an aromatic polyester soluble in universally used organic solvents consisting predominantly of chlorinated hydrocarbons and excellent in heat resistance and a process for its manufacture. Particularly, the instant invention relates to a heat resistant aromatic polyester adapted for adhesives and paints and a process for its manufacture.

Polyethylene naphthalate obtained from 2,6-naphthalenedicarboxylic acid or 2,7-naphthalenedicarboxylic acid and ethylene glycol has high mechanical strength and excellent heat and chemical resistance and is extremely useful as a material for shaped articles such as fibers, films, or plastics. Nevertheless, these polyethylene naphthalates cannot be used for purposes other than shaped articles, such as adhesives, paints and so on, because they are only sparingly soluble in universally used organic solvents of the chlorinated hydrocarbon type. Under such circumstances, with a view to making them soluble in universally used organic solvents, so far it has been attempted to use an aliphatic dicarboxylic acid or long chain aliphatic glycol in place of part of the acid component or glycol component.

The polyester obtained by this process becomes soluble in universally used organic solvents but it is accompanied by such drawbacks as being markedly inferior in heat resistance and having a reduced softening temperature.

Thus, the objective of the instant invention lies in providing a novel aromatic polyester soluble in chlorinated hydrocarbons and excellent in heat resistance.

In particular, the objective of the instant invention is to provide a novel aromatic polyester adapted for use as adhesives and paints.

In consequence of strenuous studies by the instant inventors for the achievement of the above objective, it has been discovered that by using a certain glycol component different from the conventionally used glycol component, it is made possible to obtain aromatic polyesters soluble in universally used organic solvents and having good heat resistance.

The novel aromatic polyester according to the instant invention is a linear aromatic polyester comprising, in the polyester molecule, at least 50 mole % of a repeating unit being represented by the following formula

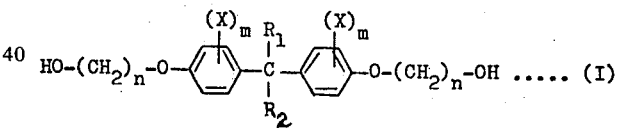

in which
R$_1$ and R$_2$ are the same or different and represent an alkyl group of 1–3 carbons, $n$ is an integer of 1–6,
X is a halogen atom and $m$ is a number of 0, 1 or 2,
with an intrinsic viscosity of 0.3 or more when measured at 35°C. by use of orthochlorophenol as a solvent.

The acid component as the main unit constituting the polyester of the instant invention is the one derived from 2,6-naphthalenedicarboxylic acid and/or 2,7-naphthalenedicarboxylic acid. It also includes a mixed component in which a part thereof (for instance, less than 50 mole %, preferably less than 30 mole %) is replaced with an aromatic dicarboxylic acid such as 1,4-naphthalenedicarboxylic acid, 1,5-naphthalenedicarboxylic acid, 1,6-naphthalenedicarboxylic acid, 2,5-naphthalenedicarboxylic acid, terephthalic acid, isophthalic acid, diphenyldicarboxylic acid, diphenylmethanedicarboxylic acid, diphenylsulphonedicarboxylic acid, diphenyletherdicarboxylic acid, diphenoxyethanedicarboxylic acid and so on and an aromatic hydroxycarboxylic acid, such as p-hydroxybenzoic acid, p-hydroxyethoxybenzoic acid and so on.

The acid component may also contain a polycarboxylic acid or poly(hydric-carboxylic) second acid component which is more than difunctional. As examples thereof there can be mentioned butanetetracarboxylic acid, tricarbamic acid, cyclopentanecarboxylic acid-2-anhydride, bi-cyclo-(2,2,2)-octene-(7)-2,3,5-tricarboxylic acid anhydride, pyromellitic acid-2-anhydride, benzophenonetetracarboxylic acid-2-anhydride, trimellitic acid anhydride, hydroxycarboxylic acid (such as 2,2-dimethylolpropionic acid, 2,2-dimethylolpropane-1,3-dicarboxylic acid) and so on. It is preferred that the ratio at which these are contained in the polymer should be 10 mole % or less based on the entire acid component.

The glycol component as the main unit constituting the polyester of the instant invention is the one derived from 4,4'-bis-(hydroxyalkoxyphenyl)-2,2-alkane being represented by the following formula

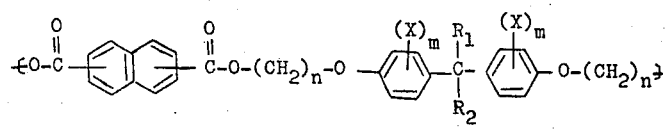

in which
R$_1$ and R$_2$ are the same or different and represent an alkyl group of 1–3 carbons, X is halogen, $n$ is an integer of 1–6 and $m$ is 0, 1 or 2.

The glycol component also includes a mixed component in which a part thereof (for instance, less than 50 mole %, preferably less than 30 mole %) is substituted with other glycols and/or polyhydric alcohols. As 4,4'-bis-(hydroxyalkoxyphenyl)-2,2-alkane being represented by the aforesaid formula (I) there can be mentioned, for instance, 4,4'-bis-(β-hydroxyethoxyphenyl)-2,2-propane, 4,4'-bis-(β-hydroxypropoxyphenyl)-2,2-propane, 2,2-bis-(3,5-dibromo-4-β-hydroxyethoxyphenyl) propane, etc. As the glycol component other than 4,4'-bis-(hydroxyalkoxyphenyl)-2,2-alkane there are, for instance, ethylene glycol, propylene glycol, butanediol, heptanediol, hexanediol, 2-methyl-1,3-propanediol, neopentyl glycol, 2-ethyl-2-methyl-1,3-propanediol, diethylene glycol, triethylene glycol, 2,2,4,4-tetramethylcyclobutanediol and so on.

Typical examples of the polyhydric alcohol component are glycerin, trimethylolpropane, pentaerythritol, tris(2-hydroxyethyl) isocyanurate, tris-(2-hydroxypropyl) isocyanurate, 1,2,4-butanetriol and so on. One component or more of these can be contained.

The polyester according to the instant invention is required to have an intrinsic viscosity of 0.3 or more when measured at 35°C. by use of orthochlorophenol as a solvent. The intrinsic viscosity ($\eta$) may be obtained by measuring the reduced viscosity ($\eta sp/C$) at various concentrations (C) and extrapolating backwards to zero concentration. With an intrinsic viscosity of less than 0.3, it becomes poor in heat resistance, hard and brittle. It is, however, preferred that its intrinsic viscosity be 0.35 or more for its high heat resistance. The upper limit is not specifically set on the intrinsic viscosity, but in the case of use as adhesives, paints, varnish and a variety of binders, it is preferably 1.80 or less from a view point of workability during its use. This is because when the intrinsic viscosity exceeds 1.80, its solubility in universally used organic solvents consisting predominantly of carbon halide is lowered to render the polymer spinnable.

For the manufacturing process per se of the polyester of the instant invention, there is employed a process in ordinary use for the production of polyesters. That is to say, the aforesaid carboxylic acids or ester-forming derivatives of these carboxylic acids, such as methyl ester, ethyl ester, phenyl ester, acryl chloride, acrylbromide and the like, and glycols and/or alcohols or their ester forming derivatives, such as acetic acid ester, oxalic acid ester and the like, are heated at 150°–240°C. Under a nitrogen atmosphere, preferably in the presence of an esterification or ester exchange catalyst, to cause the esterification or ester exchange reaction, and a bisglycol ester or low molecular weight polymer ester is obtained thereby. Preferably, a polymerisation catalyst should be subsequently added thereto and with heating and stirring continued at 240°–300°C., under a nitrogen steam or under reduced pressure a high molecular weight polymer is obtained.

For the ratio at which the acid component and the glycol component are used in the process of the instant invention it is preferred that 1–3.8 moles of the glycol component be used for every mole of the acid component. When the amount of the glycol component remains outside this range, the amount of the oligomer, which sublimes at the time of the ester exchange reaction and polymerisation reaction, becomes larger, the reaction cannot be carried on smoothly, a prolonged period of time is required for the reaction and the obtained polymer is colored, all of which are not preferred.

The ratio of the polyhydric alcohol to the acid component is suitably 10 mole % or less based on the aforesaid acid component (0.1–0.01 mole for every mole of the acid component). When the amount of alcohol is increased beyond the above quantity, the polymer is rapidly insolubilized by means of self-crosslinking to finally lead to its gelation, which is unfavorable. As catalysts for the above esterification or ester exchange, there are employed compounds of alkali metals, alkaline earth metals, zinc, lead, manganese, aluminum, silicon, phosphorus and the like.

The amount of this ester exchange catalyst varies more or less according to the type of the catalyst used, but in general, 0.005–0.2 mole % based on the dicarboxylic acid or its derivatives is preferred.

For the polymerisation catalyst there are used antimony compounds, such as antimony trioxide, antimonic acid ester and the like. It is preferred that the amount of these catalysts be 0.15 % by weight or less based on the entire acid component constituting the polyester.

In addition to the catalyst, it is also possible to add: pigments, such as inorganic pigments of titanium oxide, white lead, lithopone, red lead, zinc oxide, barite powder, antimony oxide, silica powder and Prussian Blue, and organic pigments, such as Phthalocyanine Blue, Lake Red, Hansa Yellow and the like; photostabilizers, such as benzotriazole, benzophenone, nickel phenolate copper phenolate, salicylate, sulfite and the like; heat stabilizers, as well as antioxidants, such as phenols of 2,6-di-tert-butyl-p-cresol, 4,4'-thiobis (6-tert-butyl-m-cresol) and the like and amines of N-phenyl-$\beta$-naphthlamine, N,N'-diphenyl-p-phenylene diamine and the like.

Besides these additives, it is also possible to use resin modifiers according to the desired end use. For instance, in order to improve the solvent resistance, boiling water resistance, heat resistance and adhesiveness inherent to the resins, it is possible to modify them by the use of isocyanate compounds, methylolated melamines, phenol resins, epoxy resins and so on. As the above isocyanate type compounds there can be mentioned, for instance, Desmodur-L (trademark of Bayer AG), Coronate-L (trademark of Nippon) in which 3 moles of toluylenediisocyanate were reacted for every mole of trimethlolpropane; as the methylolated melamine, for instance, Melan 20 (trademark of Hitachi) in which tetramethylolmelamine obtained by heating 4 moles of formaldehyde and 1 mole of melamine at 80°C. in an alkali solution was butyletherified with butanol; as the phenol resin, for instance, alcohol-soluble phenol in which 1 mole of carbolic acid or phenol was reacted with 1 mole of formaldehyde in the presence of an alkali catalyst; as the epoxy resin, for instance, those in which epichlorohydrin and bisphenol A were reacted at various rates, such as, for instance, Epikote 828 (trademark of Shell).

It goes without saying that the aromatic polyester according to the instant invention is soluble in phenol type solvents, such as meta-cresol, o-chlorophenol and so on, but it is also soluble (up to about 30 % by weight) in inexpensive universally used organic solvents of the chlorinated hydrocarbon type, such as methylene chloride, ethylene chloride, chlorobenzene and so on, and mixed solvents of these chlorinated hydrocarbons with general organic solvents, such as methyl ethyl ketone, ethyl acetate, toluene, xylene and so on. What is more, its softening temperature is as extremely high as 150°–180°C. With the conventional polyethylene naphthalates, while their softening temperature is high, they are only sparingly soluble in the aforesaid phenol type solvents (up to 10 % by weight at most), and they are hardly soluble in the aforesaid chlorinated hydrocarbon type solvents. With the polyester in which the acid component or glycol component is replaced with aliphatic dicarboxylic acid or long chain aliphatic glycol and so on, its solubility is high with respect to the above universally used organic solvents, but it is accompanied by drawbacks such as its softening temperature being lowered to 100°– 160°C. In contrast, as described above in the instant invention, it is possible to provide aromatic polyesters soluble in the universally used organic solvents of the chlorinated hydrocarbon type, high in their softening temperature and excellent in their heat resistance.

Thus, since the aromatic polyester of the instant invention is soluble in the universally used organic solvents and has excellent heat resistance and good adhesive force, it possesses, as paints or adhesives, excellent adhesiveness with respect to timbers, papers, films, shaped articles, woven cloths, inorganic fibers, fabrics and metals, particularly, iron, brass, chromium, aluminum, etc., giving a steadfast bonding and coating.

In particular, it has excellent adhesiveness with regard to aromatic polyester films, such as polyethylene terephthalate film, polyethylene naphthalate film and so on, and in addition, it has excellent heat resistance that has never been seen with the conventional adhesives and paints.

In addition to its utility as the above binders, varnishes, adhesives and paints, it has excellent characteristics when used as films, shaped articles and fibers. For instance, the copolymer which is a polyester consisting of 2,6-naphthalenedicarboxylic acid, 4,4'-bis($\beta$-hydroxyethoxyphenyl)-2,2-propane (hereinafter called BEPP for short) and ethylene glycol (hereinafter called EG for short) with BEPP/EG:90/10, is excellent in its wear resistance. The number of times for wear resistance was more than 70 times (700 gwt) in the JIS C3210 on the test piece with the conductor coated. It had a pencil hardness of 6H. The copolymerised film with BEPP/EG:50/50 is excellent in its insulating character and in spite of being non-crystalline, it had a BDV value of $180^{KV}$/mm, which indicated a better value than with the polyethylene terephthalate ($150^{KV}$/mm) or with the polycarbonate ($130^{KV}$/mm).

Conventional polyethylene terephthalate, because of its high crystallinity, yields an opaque shaped article with fair turbidity. Because of its non-crystallinity, the polyester of the instant invention is good in transparency and adapted for use in molding members of apparatus that is required to the transparent, such as flow meters, various electrical appliance housings, retort packages, and medical appliance materials. Moreover, because of its excellent heat resistance, the polyester can stand use under heat atmospheres of at least about 120°C.

The instant invention will be explained in more detail by way of the following Examples.

The intrinsic viscosity ($\eta$) in the Examples is a value determined when measured at 35°C. by the use of orthochlorophenol as a solvent.

The softening temperature is a value determined by the ring and ball method of JISK-2421.

"Part" is "part by weight."

EXAMPLE 1

88.7 G (40 mole %) of dimethyl 2,6-naphthalenedicarboxylate, 11.1 g (5 mole %) of dimethyl 2,7-naphthalenedicarboxylate, 8.5 g (15 mole %) of ethylene glycol and 103.2 g (40 mole %) of 4,4'-bis-($\beta$-hydroxyethoxyphenyl)-2,2-propane were charged into a 500 c.c. four-necked flask, to which a Widmer spiral with a hot jacket, thermometer, nitrogen conduit and stirrer were attached, with a water content determination receiver and a condenser provided in the upper part of the Widmer spiral. 0.1 G of lithium acetate as a catalyst were added thereto and subsequent to degasification, its temperature was gradually elevated in a nitrogen stream, it was heated and stirred at 170°–200°C., and methanol distilled out was removed from the system. Then the water in the jacket was eliminated to elevate the temperature. After that, the remaining methanol was distilled out at 200°–260°C. Stirring was continued in the reaction system at 250°C. under reduced pressure of less than 5 mmHg for a period of 1 hour. After the sublimable low molecular weight substance was distilled out, the temperature was lowered to 180°–200°C. 0.1 G of antimony trioxide was charged in at this stage and with the temperature elevated again to 270°–290°C., stirring was done under a high vacuum of less than 1 mmHg to carry on the reaction. After the lapse of 5.0 hours, the formed polymer was taken out to determine the intrinsic viscosity, which was 0.442 and its softening temperature which was 171°C. The BEPP component in the polymer so obtained was 88.5 mole % based on the entire alcohol component. 400 G of a mixed solvent of methylene chloride, ethylene chloride, methyl ethyl ketone, toluene, xylene (30:30:15:15:10 at a weight ratio) was added and dissolved with regard to 100 g of the polymer concerned, followed by further addition of 20 g of a 75 % ethyl acetate solution of an isocyanate compound prepared by reacting 3 moles of toluylene diisocyanate with 1 mole of trimethylol propane, and an adhesive was prepared thereby. The various physical properties of this adhesive were measured and the results were tabulated in Table 1.

Table 1

| Intrinsic viscosity ($\eta$) | | 0.442 |
|---|---|---|
| Resin softening temperature(°C.) | | 171 |
| (Note 1) | 25°C. | more than 100 |
| Shear adhesive strength | 50°C. | " |
| | 75°C. | " |
| (Kg/½ square inch) | 90°C. | 87.2 |
| Weight loss caused on heating(%) | | |
| (Note 2) | | 0.156 |

(Note 1): The shear adhesive strength is determined in the following way. An aluminum test piece 1.63 mm thick, 147 mm long and 25.4 mm wide was sufficiently defatted and its end 25.4 mm × 25.4 mm was ground into a foundation by means of No.400 sand paper. This part was coated with 50–60 g per m² of the adhesive resin. Two pieces were overlapped with each other at a pressure of 15 Kg/cm², 180°C. for 60 seconds, and then cooled to room temperature in that condition. Then, the pieces were taken out to be cured again at 200°C. for one hour's time. Both ends of the joined unit, centering on the joint part, were pulled by means of a universal autograph under an atmosphere held at the respective temperatures at a rate of 10 mm/minute, whereby the strength was determined.
(Note 2): This is a weight loss caused on heating at 200°C. for 84 hours' time.

EXAMPLE 2

90.3 g (37 mole %) of dimethyl 2,6-naphthalenedicarboxylate, 10.6 g (6 mole %) of dimethyl isophthalate 12.4 g (mO mole %) of ethylene glycol, 85.2 g (30 mole %) of 4,4-bis-($\beta$-hydroxyethoxyphenyl)-2,2-propane and 7.3 g (7 mole %) of neopentyl glycol were polymerised following quite the same procedures as with Example 1, whereby there was obtained a polymer having 70 mole % based on the entire alcohol component of the BEPP component, with an intrinsic viscosity of 0.531 and a softening temperature of 173°C. 100 g of the polymer were dissolved in 300 g of a mixed solvent of ethylene chloride, methyl ethyl ketone, nitroethane and xylene (solvent mixing ratio;

(60:20:10:10 by weight) to prepare a solution with a 25 % concentration. 33.3 G of an ethyl acetate 75 % solution of Coronate L (trademark of Nippon Polyurethane Kogyo) used in Example 1 was added thereto and fully stirred and mixed. After that, this resin was coated on a biaxially oriented film of polyethylene naphthalate by means of a bar coater and was subjected to contact drying. Then there was placed thereon a polyethylene naphthalate long fiber fabric (100 de. warp count: 84; filling count: 42) to be laminated at 110°C., 74 seconds, 17.4 Kg/cm², which was adhered to the film under pressure and at a temperature of 197.5°–203.5°C. during a period of 13 minutes. Compression was then continued in that condition until room temperature was reached, and a composite specimen was obtained thereby. This specimen was further subjected to curing at 180°C. for 1.2 hours. Its peel strength was measured and there was obtained results as tabulated in Table 2.

Table 2

| Peel strength (Kg/cm²) (Note: 3) | 25°C. | 0.82 |
|---|---|---|
| | 50°C. | 0.84 |
| | 90°C. | 0.69 |

Note 3) A specimen 2 cm wide by 10 cm long was used as a compression specimen and its joint part was set as 5.5 cm. Peeling was done by pulling the cloth and film in separate directions, that is, turning round at an angle of 180° with the respective ends gripped by means of chucks of a unversal autograph.

EXAMPLES 3–7

The following Table 3 indicates physical properties of the polyester obtained following quite the same procedures as with Example 1 except that types and compounded ratios of the acid component and the glycol component in Example 1 were changed as shown in Table 3.

Table 3 relates to the performances of adhesives prepared according to Example 1 except that the polyester obtained was dissolved in the same mixed solvent and then modified by adding 15–23 parts of isocyanate per 100 parts of the polyester.

Table 3

| Example | | 3 | 4 | 5 | 6 | 7 |
|---|---|---|---|---|---|---|
| Acid component | Dimethylterephthalate | 5 | 0 | 0 | 5 | 0 |
| | Dimethylisophthalate | 5 | 0 | 10 | 5 | 0 |
| | Dimethyl 2,6-naphthalene-dicarboxylate | 30 | 50 | 35 | 35 | 35 |
| | Dimethyl 2,7-naphthalene-dicarboxylate | 0 | 0 | 0 | 0 | 8 |
| Glycol component | Ethylene glycol | 20 | 10 | 7 | 10 | 10 |
| | Neopentyl glycol | 10 | 5 | 10 | 0 | 0 |
| | 4,4'-bis-β-hydroxyethoxy-phenyl-2,2-propane | 30 | 35 | 38 | 45 | 40 |
| | Hexanediol | 0 | 0 | 0 | 0 | 10 |
| Polymer | 4,4'-bis-β-hydroxyethoxy-phenyl-2,2-propane component* | 75 | 70 | 85 | 100 | 93 |
| | intrinsic viscosity η | 0.423 | 0.542 | 0.471 | 0.479 | 0.50 |
| Resin softening temperature (°C.) | | 154 | 174 | 154 | 178 | 167 |
| Shear adhesive strength(kg/½ square inch) | | more than 100 | more than 100 | more than 100 | more than 100 | more than 100 |
| Peel strength | | 0.72 | 0.69 | 0.48 | 0.60 | 0.70 |

*Mole % based on the entire alcohol component in the polymer

EXAMPLE 8

A polyester was obtained following the same procedure as Example 1 except that 4,4'-bis-(β-hydroxyproxyphenyl)-2,2-propane was used in lieu of 4,4'-bis-(β-hydroxyethoxyphenyl)-2,2-propane. It had an ηSP/C of 0.421 and a softening temperature of 157°C. with a 4,4'-bis-(β-hydroxyproxyphenyl)-2,2-propane component of 88.5 mole % based on the entire alcohol component. Measurements using the same procedures as Example 1 indicated that its adhesive strength was more than 100 Kg/½ square inch and its peel strength was 0.51 Kg/cm.

EXAMPLE 9

The solution prepared in Example 1 was cast on an aluminum plate 300 μ thick by means of a doctor blade, and measurement was made on varieties of physical properties of the coated film 20 μ thick, and its results were tabulated in Table 4. The plate was prepared before casting by grinding with No. 400 sandpaper, washing with a cleanser, and rinsing with distilled water. After being air dried, the coated film was printed at 80°C. for 5 minutes and at 200°C. for 30 minutes.

Table 4

| Items | Results |
|---|---|
| Adhesiveness (Checkers test) | 100/100 |
| Flexibility | 2 mmφ passed |
| Erichsen value | 5 mm or more |
| Pencil hardness | H |
| Surface characteristic (5 % H₂SO₄) (aqueous solution immersion) | Appearance: Nothing unusual |
| Surface characteristic (120°C. × one week later) | Appearance: Nothing unusual |

*Examples using halogenated BEPP:

EXAMPLE 10

48.8 G (30 mole %) of dimethyl 2,6-naphthalene dicarboxylate, 10.3 g (8 mole %) of dimethyl isophthalate 9.9 g. (24 mole %) of ethylene glycol, 151.2 g (36 mole %) of 2,2-bis(3,5-dibromo-4-β-hydroxyethoxyphenyl) propane were compounded to carry out the esterification reaction according to the same procedures as with Example 1. Then, the condensation polymerisation was continued at an about 10°–15°C. lower temperature than in Example 1, i.e., under as highly reduced pressure of 1 mmHg at 255°–270°C. After the lapse of 8 hours' time there was obtained a polymer having an intrinsic viscosity of 0.483 and a softening temperature of 157°C. The ratio between glycol and BEPP of the polymer so obtained, i.e., the glycol/BEPP ratio, was 5/95.

The same polymerisation was then carried out by using dimethyl terephthalate in lieu of 2,6-naphthalenedicarboxylic acid dimethyl ester and there was obtained a polymer of the same type with an intrinsic viscosity of 0.582 and a softening temperature of 152°C. The ratio between glycol and BEPP of the polymer so obtained, i.e., the glycol/BEPP ratio, was 5/95.

The two polymers were each dissolved in a mixed solvent of methylene chloride, ethylene chloride and tetrahydrofuran (the weight ratio: 30:50:20) respectively so as to have a concentration of 20 % by weight, and were each flowed on a glass plate to form films 25 μ thick.

It was found that both films were transparent and had excellent characteristics in their flame resistance, but the former film having a skeleton of the subject invention showed even higher heat resistance. Table 5 shows characteristics of the respective films.

Table 5

| Characteristic Table | | | |
|---|---|---|---|
| | Film of the polymer concerned | Film of the polymer for subject of comparison | Unit |
| Thickness | 25 | 25 | μ |
| Appearance | transparent | transparent | |
| Strength | 820 | 740 | Kg/cm² |
| Elongation | 125 | 141 | % |
| Modulus of elasticity | (20~25)×10³ | (19~23)×10³ | Kg/cm² |
| Flame resistance* | 29(SEI or O) | 27 (SEI) | LOI(UL-94) |
| 85°C. × after the lapse of 6 weeks' time Strength retention | 74 % | 62 % | |

*LOI of flame resistance is a method of ASTMD 2863-70 and indications in parentheses ( ) show measurements made according to a USA UL-94 method.

As above described, it is easily understandable that in addition to adhesives and paints, the polymers of the subject invention can be also utilized for molded articles by the general fabrication method. It is apparent from the above Examples that the subject polymers are abundant in heat resistance.

EXAMPLE 11

The solution obtained in Example 10 was incorporated with Coronate L (trademark) as the isocyanate type compound so that the weight ratio of the polymers became 100:15 and then, this paint was coated on a 25 μ thick polyethylene terephthalate film so as to become 100 μ thick. Requirements for drying the paint were 110°C., 10 minutes.

The composite film was extremely adhesive and it was found that its flame resistance was improved without impeding with the substrate film.

Its results were tabulated in Table 6.

Table 6

| | Characteristics of the film coated with the paint of the polymer concerned | | |
|---|---|---|---|
| Characteristics | Polyethylene terephthalate film 25 μ | Polyethylene terephthalate film 35 μ | Coated polyethylene terephthalate film 35 μ |
| Adhesiveness | — | — | 100/100* |
| Appearance | transparent | transparent | transparent |
| Flame | LOI 17 | LOI 17-18 | LOI 26 |

Table 6-continued

| | Characteristics of the film coated with the paint of the polymer concerned | | |
|---|---|---|---|
| Characteristics | Polyethylene terephthalate film 25 μ | Polyethylene terephthalate film 35 μ | Coated polyethylene terephthalate film 35 μ |
| resistance | UL-94 SB | UL-94 SB | UL-94 SE II |

*Measurement of adhesiveness was made in accordance with the method of Gardner/Sward, "Paint Testing Manual", 12th, p.160 (1962). Scores are carved in both longitudinal and lateral directions at intervals of 1 mm and cellophane tape is compressed on the checkers so formed. After that, the tape is rapidly peeled off. When the coated film is kept perfectly adhered to the substrate, the result is set as 100/100 whereas when 50 pieces are to be left alone, then it will be set as 50/100. This is the way the test is conducted. Thus, those samples which are greater in this numerical value are better in their adhesive performance.

EXAMPLE 12

(Examples using polyhydric alcohols)

According to the same procedures as with Example 1, condensation polymerisation was caused between 19.4 g (35 mole %) of dimethyl 2,6-naphthalenedicarboxylate, 4.5 g (34 mole %) of ethylene glycol, 143.0 g (28 mole %) of 4,4'-bis-(β-hydroxyethoxyphenyl)-2,2-propane and 0.429 g (3 mole %) of glycerin, whereby there was obtained a polymer whose intrinsic viscosity was 0.524. Its softening temperature was 165°C. and its hydroxyl value was 27.5. The Alc/BEPP ratio other than the BEPP of this resin was 20/80. After that, 100 g of the resin so obtained were dissolved in 400 g of a mixed solvent of methylene chloride, trichloroethane, tetrahydrofuran and toluene (at a respective weight ratio of 40:20:30:10) to prepare a 20 % by weight resin solution. Mixed with and added to the resultant solution was Coronate AP staple (trademark of Nippon Polyurethane Kogyo Co. Ltd.), in which the triisocyanate compound used in Example 1 was further blocked with phenols for its stabilization, at a ratio of 90 g based on 100 g of the above polymer resin and an adhesive composition was prepared thereby. This composition was coated on a copper foil (45 μ) and its preparation was made so as to yield a coated film of 26 μ thickness when dried at 130°C. × 7 minutes.

For comparison's sake, Vitel 20 (trademark of Goodyear Rubber) was selected. This is a linear aromatic polyester consisting predominantly of dimethyl terephthalate, dimethyl sebacate, ethylene glycol and neopentyl glycol and is universally used for the fabrication of adhesives and paints, particularly for processing polyester films. The comparison polyester was dissolved in a mixed solvent of methyl ethyl ketone-ethyl acetate (50:50 weight ratio) to obtain the same concentration as in the preceding Example, which was modified with the isocyanate type compound Coronate-L so that the characteristic of this resin could exhibit itself to the highest possible degree. The ratio at which it was added was 15 g based on 100 g of the resin. The adhesive was prepared in this way.

The above adhesives were coated on a polyethylene terephthalate film (75 μ) respectively so that the coated layer could become 8 μ thick after the lapse of 3 minutes at 130°C. They were integrated with the aforesaid adhesive coated copper films, which were finally compressed at 10 Kg/cm² pressure at 170°C. Flexible print circuits were obtained in this way. The adhesive power between the copper foil and the polyethylene naphthalate film was measured and the results were tabulated in Table 7.

Table 7

| Atmospheric temperature | Adhesive characteristics of copper lined films | | Remarks |
|---|---|---|---|
| | Adhesive strength of the copper lined film using the adhesive of the polymer concerned | Adhesive strength of the copper lined film using Vitel 207 | |
| Room temperature | 1.30 – 1.42 Kg/cm | 1.20 – 1.30 | T-peel test method |
| 80°C. | 0.7 – 0.8 Kg/cm | 0.02 – 0.07 | |
| 120°C. | 0.4 – 0.6 Kg/cm | 0.005 – 0.02 | |

EXAMPLE 13

Condensation polymerisation was caused according to the same procedures as Example 1 between 25.9 g (8 mole %) of dimethyl terephthalate, 29.1 g (9 mole %) of dimethyl isophthalate, 73.2 g (18 mole %) of dimethyl 2,6-naphthalenedicarboxylate, 31.0 g (29 mole %) of ethylene glycol, 49.2 g (18 mole %) of neopentyl glycol and 94.8 g (18 mole %) of 4,4-bis-(β-hydroxyethoxyphenyl)-2,2-propane, whereby there was obtained a polymer of an intrinsic viscosity 0.563 with a resin softening temperature of 147°C. The ratio between Alc and BEPP other than the BEPP of this resin was 47/53 by mol.

After being dried at 100°C. under reduced pressure for 5 hours, the polymer so obtained was discharged by means of a 30 mm extruder at a screw speed of 35 r.p.m., a drum speed of 2.9 m/minute, a die temperature of 230°C. and a cylinder temperature of 210°–260°C. A film 50 μ was obtained thereby. This film was amorphous and crystallization did not take place even when it met an organic solvent of the ketone or ester type. This film was melt adhered by means of a heat sealer at 170°C., 2 Kg/cm² for 5 seconds into a pack (20 cm × 10 cm). Refrigerated fishes were packed as contents and subjected to treatment in boiling water at 100°C. for 5 minutes. It was confirmed that the sealed part was intimately adhered and that the film was not degraded and served sufficiently as a foodstuff packaging material.

What we claimed is:

1. A linear aromatic polyester consisting essentially of, in the polymer molecule, about 50 to 100 mole % of a first repeating unit being represented by the formula

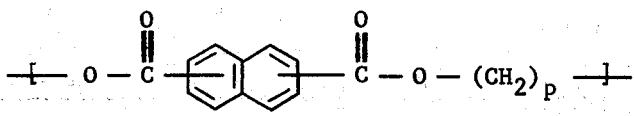

in which
R₁ and R₂ are the same or different and represent an alkyl group of 1–3 carbons, n is an integer of 1–6, X is a halogen atom and m is 0, 1 or 2;
and from 0 to about 50 mole % of a second repeating unit being represented by the formula

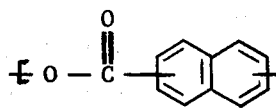

in which
p is an integer of 1–6;
with an intrinsic viscosity of 0.3 or more when measured at 35°C. by the use of orthochlorophenol as a solvent.

2. A polyester according to claim 1 in which the second repeating unit is present.

3. A polyester according to claim 2 in which the first repeating unit is at least 70 mole % and the second repeating unit is not more than 30 mole %.

4. A polyester according to claim 1, in which, in the first repeating unit, X is bromine and m = 2.

5. An adhesive consisting predominantly of the polyester of claim 1.

6. A process for the production of a linear aromatic polyester which comprises: reacting at a temperature of from 150° to 240°C. naphthalenedicarboxylic acid of the formula

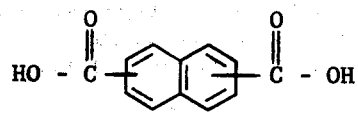

or its ester-forming derivative with (1) 4,4'-bis(hydroxyalkoxyphenyl)-2,2-alkane being represented by the formula

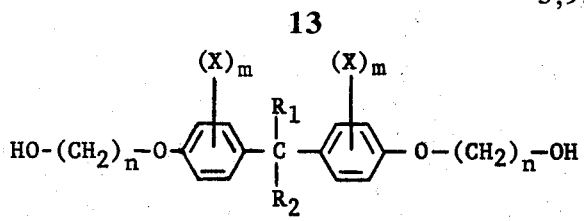

in which
R$_1$ and R$_2$ are the same or different and an alkyl group of 1–3 carbons, $n$ is an integer of 1–6, X is a halogen atom and $m$ is 0, 1 or 2, or its ester-forming derivative or (2) said 4,4'-bis(hydroxyalkoxyphenyl)-2,2-alkane or its ester-forming derivative and at least one compound selected from the group consisting of (a) aromatic carboxylic acids different from said naphthalenedicarboxylic acid or their ester-forming derivatives and (b) glycols different from said 4,4'-bis(hydroxyalkoxyphenyl)-2,2-alkane or their ester-forming derivatives, to form an ester; followed by polymerizing the ester so obtained at a temperature of 240° to 300°C.; with the proviso that the mole amount of the above glycol component be from 1 to 3.8 moles for every mole of the above acid component.

* * * * *